United States Patent [19]

Usui

[11] Patent Number: 5,667,875

[45] Date of Patent: Sep. 16, 1997

[54] EXHAUST GAS CLEANING METALLIC SUBSTRATE

[75] Inventor: Masayoshi Usui, Shizuoka-ken, Japan

[73] Assignee: Usui Kokusai Sangyo Kabushiki Kaisha, Ltd., Shizuoka-ken, Japan

[21] Appl. No.: 500,734

[22] Filed: Jul. 11, 1995

[30] Foreign Application Priority Data

Jul. 11, 1994 [JP] Japan .................. 6-180494

[51] Int. Cl.$^6$ .................. B32B 3/28; B01D 47/00
[52] U.S. Cl. .............. 428/182; 428/116; 428/184; 261/112.2
[58] Field of Search ............... 428/182, 184, 428/116; 261/112.2, DIG. 72; 52/783.4, 793.1

[56] References Cited

U.S. PATENT DOCUMENTS

| | | | |
|---|---|---|---|
| 684,561 | 10/1901 | Weston | 428/184 |
| 3,432,379 | 3/1969 | Anderson | 428/184 |
| 4,915,878 | 4/1990 | György et al. | 428/184 |
| 4,917,935 | 4/1990 | Kubicek | 428/184 |

FOREIGN PATENT DOCUMENTS

| | | |
|---|---|---|
| 62-273051 | 11/1987 | Japan . |
| 63-182038 | 7/1988 | Japan . |
| 64-30651 | 2/1989 | Japan . |
| 2-83033 | 6/1990 | Japan . |
| 283033 | 6/1990 | Japan . |
| 2-150032 | 12/1990 | Japan . |
| 3-502660 | 6/1991 | Japan . |
| 3-502544 | 6/1991 | Japan . |
| 4-227855 | 8/1992 | Japan . |

OTHER PUBLICATIONS

JIS G4312 SUH310S (with English Translation).

*Primary Examiner*—Donald Loney
*Attorney, Agent, or Firm*—Lowe, Price, LeBlanc & Becker

[57] ABSTRACT

An exhaust gas cleaning metallic honeycomb body for supporting thereon an exhaust gas cleaning catalyst is described. The body is of a honeycomb structure formed by alternately superposing two types of corrugated bands made of metal sheets one over the other in a contiguous relation and defining a number of network-patterned gas flow passages along a central axis thereof. The two types of corrugated bands comprise:

(i) a first corrugated band having a triangular waveform of the structure that substantially-equilateral triangles are continuously connected in a lengthwise direction; and (ii) a second corrugated band having a substantially a sinusoidal waveform.

4 Claims, 3 Drawing Sheets

EXHAUST GAS CLEANING METALLIC SUBSTRATE

BACKGROUND OF THE INVENTION

1.) Field of the Invention

This invention generally relates to a metal-made honeycomb body (hereinafter called the "metallic honeycomb body") useful as a principle component of an exhaust gas cleaning device for an automotive vehicle in order to support thereon an exhaust gas cleaning catalyst.

More specifically, this invention provides a metallic honeycomb body, a principal component of an exhaust gas cleaning device of the above-mentioned type employed under severe conditions, which has been improved in durability against deformation and breakage which would occur by expansion and stress under heat.

2.) Description of the Related Art

The construction of a typical conventional exhaust gas cleaning device A' of the above-described type is shown in FIG. 5 through FIG. 7.

Namely, the typical conventional exhaust gas cleaning device A' is constructed of a stacked multi-layer structure of a honeycomb structure, in other words, a metallic honeycomb body H' and a cylindrical metallic casing (hereinafter called the "metallic casing") 4. The metallic honeycomb body H' has been formed by superposing a planar metal band 1' of a heat-resistant steel sheet and a corrugated band 2', which was formed by corrugating a similar steel sheet, one over the other in a contiguous relation and then rolling them into a spiral form (see FIG. 5) or by stacking such planar bands and corrugated bands in layers (see FIG. 6), thereby defining a number of network-patterned gas flow passages (which may hereinafter be called "cells") along a central axis of the resulting metallic honeycomb body. The cylindrical metallic casing 4 is open at opposite ends thereof so that the metallic honeycomb body H' can be inserted and fixed in the casing.

Incidentally, FIG. 7 illustrates the structures of the planar and corrugated bands 1',2' making up the metallic honeycomb body H' of the rolled type (see FIG. 5) or the stacked (layered) type (see FIG. 6) as well as the positional relationship between these bands 1' and 2'.

In the present field of art, the above-described exhaust gas cleaning device A' is also called a metallic converter because it is constructed of the metallic honeycomb body and the metallic casing.

The planar band and the corrugated band, which make up the metallic honeycomb body, as well as the metallic honeycomb body and the metallic casing are firmly fixed together by a fixing method such as brazing or welding at points or areas of contact there-between, so that the resulting exhaust gas cleaning device A' can withstand thermal expansions and thermal stress, which occur because of the high temperature of exhaust gas itself and exothermic reactions of exhaust gas induced by a cleaning catalyst, and also vibrations during running of an associated automotive vehicle.

From the standpoint of a price competition with exhaust gas cleaning devices which are each equipped with a conventional honeycomb body made of a cordierite ceramic, there is a recent move toward constructing an exhaust gas cleaning device without using a separately-fabricated metallic casing for enclosing and firmly holding a metallic honeycomb body therein, in other words, by using only a metallic honeycomb body. As no metallic casing is used in this case, the fabrication cost of the metallic casing as well as the cost for inserting and fixing the metallic honeycomb body in the metallic casing, that is, the canning cost are no longer needed, thereby obviously leading to a substantial cost merit.

As will be explained below, the above-described conventional exhaust gas cleaning devices—which are each constructed of only metallic honeycomb body fabricated using a planar band and a corrugated band made of metal sheets—however cannot withstand long-term use even if they are provided with metal casings.

Based on thermal expansion and thermal stress which are produced in an atmosphere of the high temperature of exhaust gas itself and the heat generated through catalytic reactions of unburned gas induced by an exhaust gas cleaning catalyst, significant deforming force occurs especially in a direction perpendicular to an axial direction (i.e., the direction in which exhaust gas flows in and passes) of the metallic honeycomb body, to say nothing of the axial direction. The direction perpendicular to the axial direction will hereinafter be called the "radial direction of the metallic honeycomb body". Because of a temperature gradient between a central part of the metallic honeycomb body and its outer peripheral part, the deforming force tends to propagate close to the outer peripheral part of the metallic honeycomb body or close to points or areas of contact between an outer peripheral wall of the metallic honeycomb body and an inner peripheral wall of the metallic casing through the component members (the planar band and the corrugated band) of the metallic honeycomb body.

In the course of the propagation of the thermal deforming force, the component members of the metallic honeycomb body may be deformed, buckled, cracked or otherwise broken. In particular, the thermal deforming force concentrates near the outer peripheral wall of the metallic honeycomb body or around the points or areas of contact between the outer peripheral wall of the metallic honeycomb body and the inner peripheral wall of the metallic casing, the planar and/or corrugated bands made of the metal sheets and forming the metallic honeycomb body at such places also undergo substantial cracking, breakage or buckling, and separation or detachment takes place at points or areas of contact between the respective bands or at points or areas of contact between the metallic honeycomb body and the metallic casing. These problems significantly impair the durability of the exhaust gas cleaning device.

As measures for the improvement of the durability of the metallic honeycomb body especially in the radial direction under thermal deforming force, the following proposals have been made:

i) Japanese Patent Application Laid-Open (Kokai) No. SHO 63-182038 discloses a technique for fabricating a metallic honeycomb body from a first corrugated band and a second corrugated band having mutually-different wavelengths (periods) and waveheights (amplitudes). Namely, it is attempted to withstand radial pressure and expansion, which occur through thermal deformation cycles, by using a first corrugated band having a relatively large period and amplitude and a second corrugated band having a relatively small period and amplitude.

This technique however requires, as a premise, use of corrugated plates of sinusoidal curves or like curves as the first and second corrugated plates. Further, with respect to the manner of contact between the first corrugated plate and the second corrugated plate, it is difficult to take the structure that the corrugated plates are maintained in contact with each other in a ridge-to-groove or groove-to-ridge relationship (needless to say, this contacting relationship is preferred for the assurance of strength at the points or areas of contact). Even if both the corrugated bands are fixed together by brazing at points of contact therebetween, they are caused to separate from each other under the above-described large thermal deforming force so that various drawbacks will be developed in association with the separation, such as breakage of the corrugated plates.

ii) Japanese Patent Application Laid-Open (Kokai) No. SHO 64-30651 discloses a technique for fabricating a metallic honeycomb body from a planar band and a corrugated band. The planer band has curved concave surface portions formed in advance so that the planar band can be brought into fact-to-face contact with the curved convex surface portions (the ridges and grooves) of the corrugate band. Hence, the planer band may also be regarded as a kind of corrugated band. A primary object is to bring both the bands into face-to-face (inner/outer) contact at their respective convex/concave surface portions, thereby making it possible to improve the joining strength and also to save expensive γ-alumina upon wash coating. Moreover, the planar band is in a wavy form as described above so that as a secondary advantage, radial thermal deforming force can be reduced by the curved surface portions.

In the above-described proposal, however, many of the curved convex surface portions formed on the planar plate are maintained in face-to-fact contact with the ridge portions (or the groove portions) of the corrugated plate, resulting in the drawback that the characteristic property of the planar plate to absorb and lessen the thermal deforming force is reduced.

iii) Japanese Utility Model Application Laid-Open (Kokai) No. HEI 2-150032 discloses a metallic catalyst substrate of the structure that small-wave planar plates having a number of small waves (which may also be called "micro-corrugation") and flattened-top corrugated plates, in each of which top portions of waves have a flat shape, are alternately stacked. Each small-wave planar plate is so dimensioned that two or more small waves are brought into contact with each flattened top portion of the associated flattened-top corrugated plate. An object of this invention is to prevent filming-out (telescoping) of the metallic honeycomb body in the axial direction. This proposal however involves various problems such that the small-wave planar plates are difficult to fabricate because their small waves have a sinusoidal waveform with a small pitch (wavelength), the waveform may be stretched to its full length due to working stress applied upon fabrication of the metallic honeycomb body by rolling, and upon brazing or catalyst coating, the small wave portions may be clogged to result in a large back pressure.

iv) Japanese Utility Model Application Laid-Open (Kokai) No. HEI 2-83033 discloses a technique for fabricating a metallic catalyst substrate by using only corrugated plates having a corrugated structure of such a modified waveform that openings of lower portions are formed narrow and upper portions are formed broad, for example, only modified corrugated plates having an Ω shape (in the form of the "omega" character) or an inverted triangular shape (in the form that triangles are arranged by alternately reversing their directions)

The metallic honeycomb body which makes up the metallic catalyst substrate is however fabricated only from the deformed corrugated plates described above, so that it has a rigid structure and is hence insufficient in its absorbing and lessening effects for thermal deforming force.

As has been described above, a great deal of efforts has been made to develop a metallic honeycomb body which is suitable for use in an exhaust gas cleaning device and has a structure sufficient to withstand thermal deforming force. However, no fully satisfactory metallic honeycomb body has been obtained yet.

SUMMARY OF THE INVENTION

With a view to overcoming the drawbacks of the metallic honeycomb bodies which are principal components of the above-described conventional exhaust gas cleaning devices, the present inventor has proceed with an extensive investigation.

As a result, it was found that a metallic honeycomb body having a well-balanced rigid structure and flexible structure can be obtained when the metallic honeycomb body is constructed by using (i) a first corrugated band having a triangular waveform of the structure that substantially-equilateral triangles are continuously connected in a lengthwise direction and (ii) a second corrugated band having a substantially a sinusoidal waveform instead of conventional members (a planar band and a corrugated band) for a metallic honeycomb body and that large deforming force, which are produced based on thermal expansion and thermal stress and is transmitted and propagated in the radial direction of the metallic honeycomb body, can be absorbed and lessened. These findings have then led to the completion of the present invention.

In one aspect of the present invention, there is thus provided an exhaust gas cleaning metallic honeycomb body for supporting thereon an exhaust gas cleaning catalyst, said body being of a honeycomb structure formed by alternately superposing two types of corrugated bands made of metal sheets one over the other in a contiguous relation and defining a number of network-patterned gas flow passages along a central axis thereof, characterized in that said two types of corrugated bands comprise:

(i) a first corrugated band having a triangular waveform of the structure that substantially-equilateral triangles are continuously connected in a lengthwise direction; and (ii) a second corrugated band having a substantially a sinusoidal waveform.

The metallic honeycomb body according to the present invention, which is suitable for use as a principal component in an exhaust gas cleaning device, is constructed of the two types of corrugated bands of particular shapes different in waveform, more specifically of (i) the first corrugated band having a triangular waveform of the structure that substantially-equilateral triangles are continuously connected in a lengthwise direction and (ii) the second corrugated band having a substantially a sinusoidal waveform.

Of the above-described two types of different corrugated bands, the first corrugated band plays a particularly important role in absorbing and lessening deforming force, which is produced based on large thermal stress developed inside the metallic honeycomb body, through its cooperation with the second corrugated band so that rigidity is imparted to the metallic honeycomb body. The exhaust gas cleaning metallic honeycomb body according to the present invention is therefore provided with both a rigid structure and a flexible structure.

Namely, owing to the use of the two types of corrugated bands of the specific waveform structures, the exhaust gas cleaning metallic honeycomb body according to the present invention can significantly improve the property to follow up thermal expansions and shrinkages which occur inside the metallic honeycomb body under severe thermal conditions. It is therefore possible to effectively prevent buckling, cracking or breakage of the constituent members (the first and second corrugated bands) of the metallic honeycomb body and detachment of the constituent members at points or areas of contact therebetween.

Reflecting the above-described advantageous effects, it is also possible to effectively prevent separation or peeling-off of an exhaust gas cleaning catalyst to be formed on walls of the metallic honeycomb body.

DETAILED DESCRIPTION OF THE INVENTION AND PREFERRED EMBODIMENT

Figure 1:
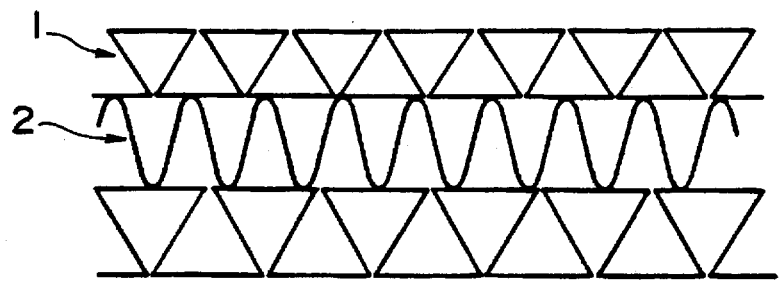
FIG. 1 illustrates a contacting relationship between a first corrugated band having a substantially triangular waveform and a second corrugated band having a substantially sinusoidal waveform in an exhaust gas cleaning metallic honeycomb body according to a first embodiment of the present invention.

Technical features and a preferred embodiment of the present invention will hereinafter be described in detail with reference to the accompanying drawings. Needless to say, it should however be borne in mind that the present invention is not limited to or by the illustrated embodiment.

For an exhaust gas cleaning device for an automotive vehicle, said device making use of a honeycomb body, it is extremely important to provide the exhaust gas cleaning device with sufficient durability against deforming force based on thermal expansion and thermal stress (strain). This deforming force may hereinafter be called "thermal deforming force".

A metal-made exhaust gas cleaning device of the above-described type is exposed to a severe thermal environment even during running, to say nothing of such an alternating thermal load of a heating/cooling cycle as observed during an operation and at a stop and a subsequent re-start. The durability of the metal-made exhaust gas cleaning device against heat-induced deforming force is therefore an extremely important theme.

With the foregoing in view, conditions during running of an automotive vehicle will next be considered. An exhaust gas cleaning device is exposed to higher temperatures at a central part thereof than at a peripheral part thereof because of a difference in the flow velocity distribution of exhaust gas in an exhaust pipe, that is, a difference in flow velocity between the central part and the peripheral part and also catalytic reactions (exothermic reactions) of exhaust gas induced by an exhaust gas cleaning catalyst, such as Pt, Pd and/or Rh, supported on surfaces of the honeycomb carrier body. For example, the temperature of an exhaust gas cleaning device of this type generally ranges from 700° C. to 800° C. but may arise to 1,000° C. or so where HC (hydrocarbons) are exhaust abundantly.

Here, the temperature gradient inside the metallic honeycomb body will be discussed in further detail. The temperature gradient between the outer periphery of the metallic honeycomb body and a portion of the metallic honeycomb body, said portion being located slightly inside the outer periphery, is substantially greater than a temperature gradient in the vicinity of the central part of the metallic honeycomb body. The temperature gradient is still greater because the outer peripheral wall of the metallic honeycomb body is directly exposed to the external air or the metallic honeycomb body is secured in a cylindrical metallic casing which is exposed to the external air and rain water.

In the exhaust gas cleaning device constructed of the metallic honeycomb body alone (i.e., of the type that no metallic casing is used) or the exhaust gas cleaning device constructed of the metallic honeycomb body and the metallic casing, strong deforming force based on thermal expansion or stress, which deforming force may hereinafter be called "deforming force under heat" or "thermal deforming force", propagates to the portion near the outer peripheral wall and concentrates there as heat propagates from the high-temperature-side central part of the metallic honeycomb body to the region near the low-temperature-side outer peripheral wall of the metallic honeycomb body, namely, in the radial direction of the metallic honeycomb body.

The large deforming force produced based on the heat propagated in the radial direction of the honeycomb core body causes the component members of the metallic honeycomb body to deform or buckle in the course of its propagation, to separate from each other along the passage of time even when the component members are firmly fixed together at points of contact therebetween by brazing or the like, or to crack or break. These deleterious effects become significant especially near the outer peripheral wall of the metallic honeycomb body, where the thermal deforming force concentrates.

In association with these separation, cracking and/or breakage, the expensive catalyst layer supported on the surface of each component member is also separated off so that the exhaust gas cleaning ability is lowered significantly.

The above-described situation also arises even in the case of an exhaust gas cleaning device in which a metallic honeycomb body is inserted in a metallic casing and the metallic honeycomb body is firmly fixed at an outermost peripheral wall thereof on an inner peripheral wall of the metallic casing. In this case, the state of fixed securement between the outer peripheral wall of the metallic honeycomb body and the inner peripheral wall of the metallic casing is therefore lost by the large thermal deforming force, so that detachment of both the elements from each other takes place and the durability is significantly impaired.

To eliminate or reduce the above-described draw-backs such as deformation, buckling or breakage observed on the constituent members of the above-described metallic honeycomb body, it is therefore indispensable to adopt means for effectively absorbing and reducing deforming force which is produced based on thermal expansion or thermal stress in the structure of the metallic honeycomb body, especially in the radial directions of the metallic honeycomb body.

From the above-described viewpoint, the present invention uses, as the component members of the metallic honeycomb body, two types of corrugated bands which comprise:

(i) a first corrugated band 1 having a triangular waveform of the structure that substantially-equilateral triangles are continuously connected in a lengthwise direction; and (ii) a second corrugated band 2 having a substantially a sinusoidal waveform.

Figure 7:
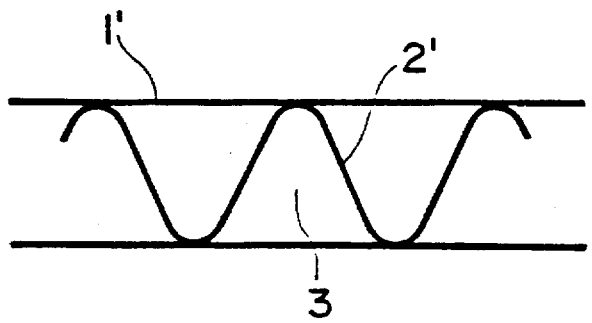
FIG. 7 schematically depicts a contacting relationship between the planar band and the corrugated band in the rolled metallic honeycomb body of the conventional exhaust gas cleaning device shown in FIG. 5.

FIG. 1 illustrates the constructions of a first corrugated band 1 and a second corrugated band 2, and is a figure corresponding to FIG. 7 (prior art).

Figure 2:
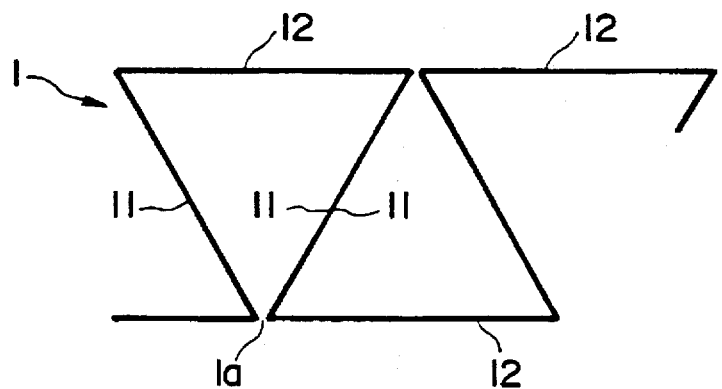
FIG. 2 is an enlarged view of the first corrugated band having the substantially triangular waveform.

FIG. 2 is an enlarged front view of the first corrugated band 1.

As is depicted in these figures, especially in FIG. 2, the first corrugated band 1 has been formed by continuously connecting substantially equilateral triangles, which are units to be continuously connected together (i.e., minimal repeat units), in a lengthwise direction of the band with each adjacent two of the substantially equilateral triangles sharing a common side 11.

Accordingly, the remaining sides 12 of every first ones of the substantially equilateral triangles form a top wall and those of every second ones of the substantially equilateral triangles form a bottom wall, and the top and bottom walls are parallel to each other.

In the present invention, vertex portions 1a, which are formed upon connection of the substantially equilateral triangles (continuously connected units), are preferred to remain in a closed state as much as possible so that each of the continuously-connected units form a substantially equilateral triangle and vertex portions (ridge and groove portions of a wave) of the second corrugated band 2 are prevented from falling down. In the present invention, the term "substantially equilateral" is used in the above-described sense.

In the present invention, the first corrugated band 1 is extremely important for providing the metallic honeycomb body with the rigid structure and the flexible structure.

Figure 3A:
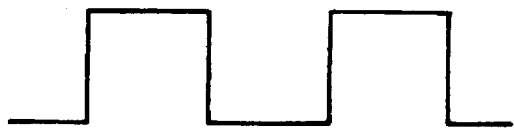
FIGS. 3A and 3B schematically illustrate a manner of fabrication of the first corrugated band having the substantially triangular waveform.
Figure 3B:
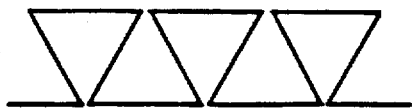

FIGS. 3A and 3B illustrate one example of fabrication of the first corrugated band 1. A corrugated material in the form of a rectangular wave is formed in the step shown in FIG. 3A, followed by the step illustrated in FIG. 3B so that each rectangular wave is formed into a substantially equilateral triangle, for example, by compressed the rectangular wave in a lateral direction.

In the present invention, the above-described second corrugated band 2 having the substantially sinusoidal wave is formed of one having a corrugated structure and employed for the fabrication of a metallic honeycomb body of the above type.

In the second corrugated band 2, the radius of curvature of the vertex portion (the ridge portion or groove portion) of each of the continuously connected units (the minimal repeat unit) may have a desired value. In the present invention, the term "substantially sinusoidal wave" is used in the above-described sense.

In the present invention, the second corrugated band 2 and the first corrugated band 1 are fixed together at at least some of points or areas of contact therebetween. For example, they are brazed together with a brazing material. To make as small as possible the part where a fillet of a brazing material is formed at each point or area of contact and hence to increase the amount of a catalyst to be supported, a smaller radius of curvature is obviously preferred for the vortex portions (i.e., the ridge portions or groove portions) of the second corrugated band 2.

No particular limitation is imposed on the sizes of the waveforms of the first corrugated band 1 and the second corrugated band 2 in the present invention.

Employed in general are 0.8 mm to 5 mm as the waveheights (heights) of the first and second corrugated bands 1,2 and 2 mm to 10 mm as the pitch of the second corrugated band 2.

The first and second corrugated bands 1,2 usable for the fabrication of the metallic honeycomb body in the present invention are furnished by working bands useful upon fabrication of an ordinary metallic monolithic honeycomb body, for example, bands having a thickness of about 0.04 mm to 0.1 mm and made of chromium steel (13–25% chromium), heat-resisting stainless steel such as Fe-20%Cr-5%Al or heat-resisting stainless steel with rare earth metals (REMs) added to such chromium steel or stainless steel to improve its high-temperature oxidation resistance, so that the bands can have a desired waveform.

Preferred as the first and second corrugated bands 1,2 are those containing Al or those carrying a layer of alumina $(Al_2O_3)$ in a whisker or mushroom form deposited on their surfaces by heat-treatment of steel bands having an Al layer formed on their surfaces. Alumina in a whisker form or the like is desired because it can firmly hold a washcoat layer on which an exhaust gas cleaning catalyst formed of Pt, Pd, Rh and the like is supported.

Figure 4:
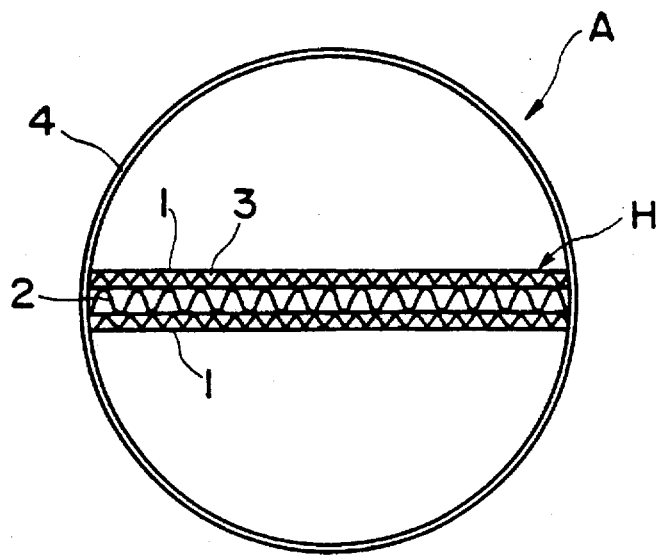
FIG. 4 is a front view of an exhaust gas cleaning device making use of a stacked (layered) metallic honeycomb body composed of plural first corrugated bands and plural second corrugated bands of the same types as the first and second corrugated bands shown in FIG. 1, in which showing of parts of the metallic honeycomb body is omitted.
Figure 5:
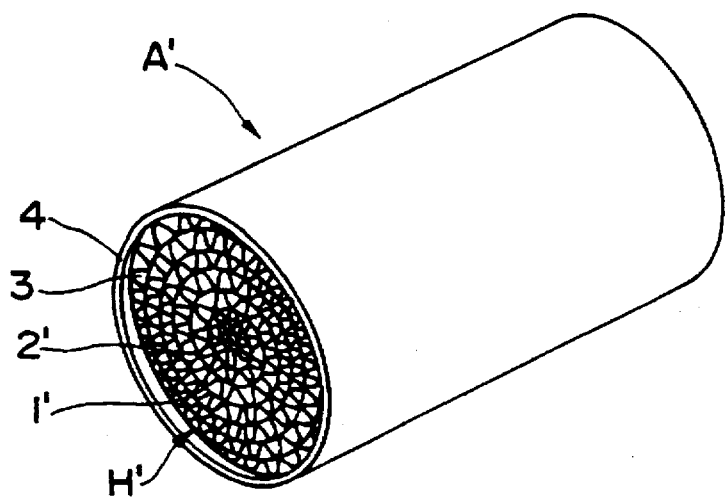
FIG. 5 is a perspective view of a conventional exhaust gas cleaning device making use of a rolled metallic honeycomb body composed of a planar band and a corrugated band.
Figure 6:
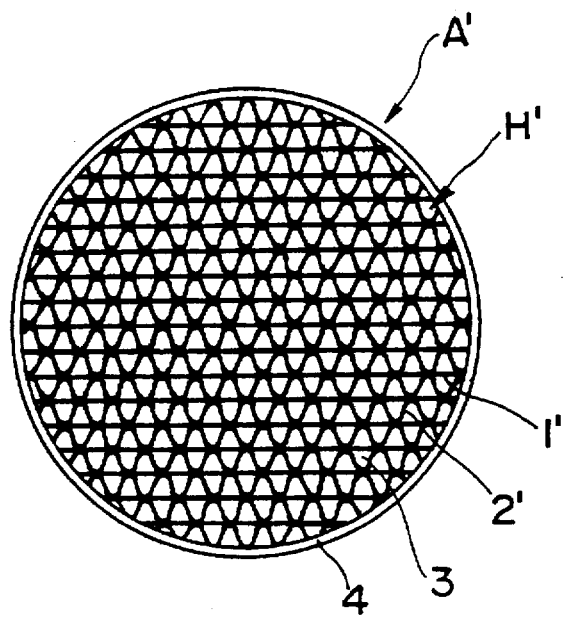
FIG. 6 is a front view of another conventional exhaust gas cleaning device making use of a stacked (layered) metallic honeycomb body composed of planar bands and corrugated bands.

The exhaust gas cleaning device A shown in FIG. 4 has been fabricated by enclosing and fixing a metallic honeycomb body H in a metallic casing 4. The metallic honeycomb body H is formed of a plurality of first corrugated bands 1 of the same type as the above-described first corrugated band 1 and a like plural number of second corrugated bands 2 of the same type as the above-described second corrugated band 2. Accordingly, FIG. 4 corresponds to FIG. 6 (prior art). Incidentally, FIG. 4 shows only two first corrugated bands 1 and one second corrugated band 2 and the remaining first and second corrugated bands are omitted, so that the construction of the metallic honeycomb body H can be clarified.

When the metallic honeycomb body H is fabricated using the above-described first and second corrugated bands 1,2 in the present invention, the structure of the metallic honeycomb body H so fabricated is not limited to the stacked (layered) type shown in FIG. 4. For example, the metallic honeycomb body may be of the rolled type described above in connection with the related art or may have the structure of the S-shaped type, the type that three huge commas are so united as to make a perfect circle, the X-wrapped (swastika-patterned) type or the like known in the present field of art and disclosed in Japanese Patent Application Laid-Open (Kokai) No. SHO 62-273051, Japanese Language Laid-Open Publication (PCT) No. HEI 3-502544, Japanese Language Laid-Open Publication (PCT) No. HEI 3-502660, Japanese Patent Application Laid-Open (Kokai) No. HEI 4-227855 or the like.

Further, the shape of the metallic honeycomb body H as observed in a front view (or a cross-sectional view) is not limited to the circular shape shown in the drawings and may be in any desired shape such as an oval shape or racetrack shape.

As is illustrated in FIG. 4, the metallic honeycomb body H according to the present invention is enclosed and fixed in the metallic casing 4 to provide the exhaust gas cleaning device A.

No particular limitation is imposed on the shape and structure of the above-described metallic casing 4 insofar as its opposite ends are open.

Namely, the shape of the metallic casing 4 as observed in a front view (or a cross-sectional view) may be any desired shape which is in conformity with the shape of the metallic honeycomb body H to be enclosed. Usable as the material of the metallic casing 4 is a heat-resistant steel of the same type as the bands 1,2 making up the above-described honeycomb body or a material having a double-layered structure and high heat and corrosion resistance, specifically a clad steel using ferritic stainless steel as an inner layer and austenic stainless steel as an outer layer.

The present invention will hereinafter be described in further detail on the basis of the following Example.

(i) Production of the First and Second Corrugated Bands:

From steel sheets made of a heat-resistant steel of Fe-20%Cr-5%Al-0.02%Ce and having a thickness of 0.04 mm and a width of 74.5 mm, were produced first corrugated bands 1 and second corrugated bands 2 having the waveforms shown in FIG. 1.

Namely, the first corrugated bands 1 were produced by setting each side of each substantially equilateral triangle at 1.2 mm while the second corrugated bands 2 were produced by setting their pitch and waveheight at 2.5 mm and 1.2 mm, respectively.

(ii) Fabrication of a Honeycomb Carrier Body:

As shown in FIG. 4, the first and second corrugated bands 1,2 were then alternately stacked one over the other so that a metallic honeycomb body H of a cylindrical honeycomb structure (outer diameter: 70 mm) was fabricated.

Next, the metallic honeycomb body H was inserted in a metallic casing 4 having an inner diameter of about 70 mm and made of a heat-resistant steel (JIS G4312 SUH310S). Opposite ends of the metallic honeycomb body and their adjacent portions (regions up to 10 mm from the respective ends) were dipped in a slurry of a nickel-base brazing material and, after the slurry was dried, the metallic honeycomb body H was heat-treated in a vacuum furnace, whereby the metallic honeycomb body H and the metallic casing 4 were brazed together.

On the exhaust gas cleaning device A fabricated as described above, catalyst carrying layers were then formed as will be described next. Namely, the surfaces of individual bands 1,2 forming the metallic honeycomb body H were coated with a slurry of activated alumina ($\gamma$-$Al_2O_3$) powder and an alumina sol. The metallic honeycomb body so coated was then heat-treated at 600° C. so that catalyst supporting layers were formed.

Evaluation of Performance

The above-described exhaust gas cleaning device A provided with the catalyst supporting layers was subjected to a quick heating and cooling test (burner spalling test) consisting of 100 cycles each ranging from room temperature to 900° C. and also to a vibration test. No buckling, cracking or breakage was observed at any part of the component members (the first and second corrugated bands) of the metallic honeycomb body. Further, neither separation nor detachment was observed at any point or area of contact. In addition, neither falling nor separation of any catalyst supporting layer was observed.

What is claimed is:

1. In an exhaust gas cleaning metallic honeycomb body for supporting thereon an exhaust gas cleaning catalyst, said body being of a honeycomb structure formed by alternately superposing two types of corrugated bands made of metal sheets one over the other in a contiguous relation and defining a number of network-patterned gas flow passages along a central axis thereof, the improvement wherein said two types of corrugated bands comprise:

(i) a first corrugated band having a triangular waveform of the structure that substantially-equilateral triangles are continuously connected in a lengthwise direction; and (ii) a second corrugated band having a substantially sinusoidal waveform, said second corrugated band being superposed on the first corrugated band and in contiguous relationship therewith.

2. An exhaust gas cleaning metallic honeycomb body according to claim 1, wherein said first corrugated band is of the structure that substantially equilateral triangles are continuously connected together in a lengthwise direction with each adjacent two of the substantially equilateral triangles sharing a common side.

3. An exhaust gas cleaning metallic honeycomb body according to claim 1, wherein said first corrugated band is of the structure that substantially equilateral triangles are continuously connected together in a lengthwise direction with each adjacent two of the substantially equilateral triangles sharing a common side; the remaining sides of every first ones of the substantially equilateral triangles form a top wall and those of every second ones of the substantially equilateral triangles form a bottom wall; and the top and bottom walls are parallel to each other.

4. An exhaust gas cleaning metallic honeycomb body according to claim 1, wherein in substantially equilateral triangular units as minimum structural units of said first corrugated band, vertex portions formed upon connection of the substantially equilateral triangular units are substantially closed.

* * * * *